United States Patent [19]

Humbert

[11] 4,228,378

[45] Oct. 14, 1980

[54] WIRE WOUND DISC ARMATURE FOR DYNAMOELECTRIC MACHINE

[76] Inventor: Marcel E. Humbert, 295 Indian Rd., Toronto, Ontario, Canada, M6R 2X5

[21] Appl. No.: 40,485

[22] Filed: May 21, 1979

[51] Int. Cl.³ .............................................. H02K 1/22
[52] U.S. Cl. .................................................... 310/268
[58] Field of Search ......................................... 310/268

[56] References Cited

U.S. PATENT DOCUMENTS

| | | | |
|---|---|---|---|
| 189,997 | 4/1877 | Brush | 310/268 |
| 459,610 | 9/1891 | Desroziers | 310/268 |
| 3,294,997 | 12/1966 | Shapiro | 310/268 |
| 3,845,339 | 10/1974 | Merkle et al. | 310/268 X |
| 3,953,751 | 4/1976 | Merkle et al. | 310/268 X |

*Primary Examiner*—Mark O. Budd
*Attorney, Agent, or Firm*—George H. Riches & Associates

[57] ABSTRACT

This invention relates to an improved wire wound disc type armature for electric motors or generators. The armature has a disc shaped body mounted on a central shaft with a commutator formed of spaced insulated commutator elements located around it. The disc shaped body has opposing flat sides on which a predetermined number of wire windings are located. The insulated wire forming each winding extends outward from the commutator through a U-shaped wire channel on one side of the disc shaped armature and back through a corresponding wire channel on the other side. The disc shaped body of the armature is formed of high strength plastic and the wire channels are formed of laminated steel. In one embodiment, the wire then passes through an aperture in the disc shaped body associated with each winding and back out through the first wire channel and this is repeated until a winding of a desired number of turns is formed in the two channels. This structure and winding configuration provides the significant advantage that the amount of wire used which does not pass through the magnetic field during use is kept to a minimum. This reduces initial wire costs and more significantly, decreases heat and other losses which otherwise occurs in the excess wire, as well as minimizes interference currents which may be induced on current reversals.

6 Claims, 8 Drawing Figures

WIRE WOUND DISC ARMATURE FOR DYNAMOELECTRIC MACHINE

BACKGROUND OF THE INVENTION

This invention relates generally to dynamoelectric machines and, more particularly, to an improved wire sound disc type armature for such machines.

Dynamoelectric machines having disc type armatures are well known. See, for example, U.S. Pat. No. 3,466,483 which issued Sept. 9, 1969 to Johnson et al. and No. 3,558,947 which issued Jan. 26, 1971 to Robert B. Burr. The printed circuit machines have not been successful in replacing the conventional motors and generators, and the previous wire wound machines have disadvantages in initial costs, efficiency and repair. In wire wound armatures, it is very desirable to avoid the use of excess wire which is not located in the magnetic field during use. Such wire not only is costly to obtain and install, but the current flowing through the wire causes heat losses and decreases efficiency. Furthermore, excess wire is undesirable in order to minimize interference currents which may be induced in the windings on current reversals.

SUMMARY OF THE INVENTION

Accordingly, it is an object of the present invention to at least partially overcome these disadvantages by providing an improved wire wound armature of the disc type for dynamoelectric machines.

To this end, in one of its aspects, the invention provides an improved disc type armature for a dynamoelectric machine comprising:

(a) a body mounted on a central shaft and commutator means adjacent the shaft, the body being disc shaped with first and second sides and an outer rim; and (b) a plurality of windings on the disc shaped body, each winding formed of insulated wire extending from the commutator means radially outward along the first side of the body and back along the second side of the body.

Further objects and advantages of the invention will appear in the following description taken together with the accompanying drawings.

DETAILED DESCRIPTION OF THE DRAWINGS

Figure 1:
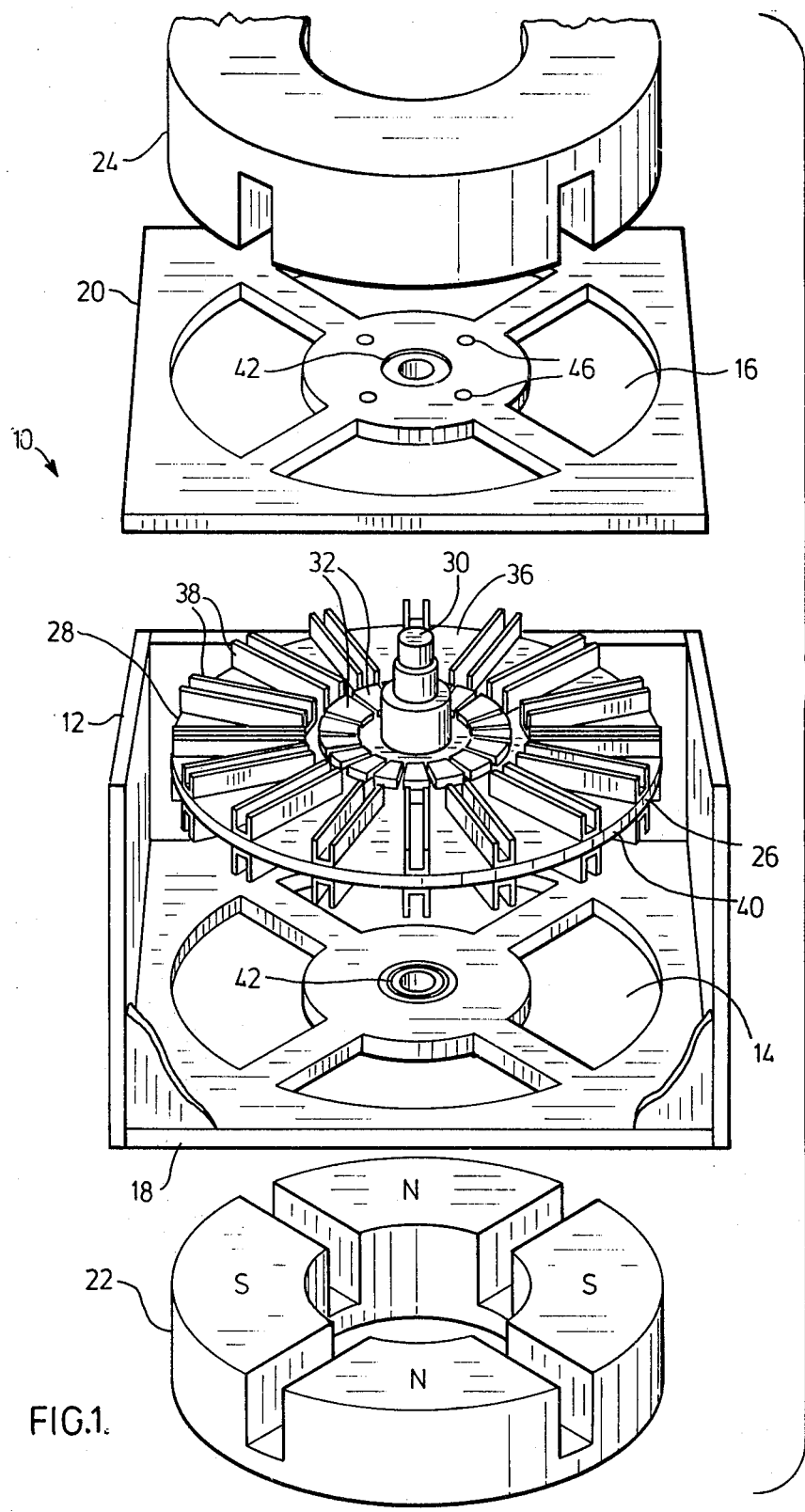
FIG. 1 is an exploded perspective view of an electric motor having an armature according to a first embodiment of the invention.

Reference is first made to FIG. 1 which shows a dynamoelectric machine 10 which may be an electric motor or generator and which may, depending upon the connection to the commutator, have any arrangement of winding such as lap, multiplex, wave, frog-leg, series, parallel, halfwave, fullwave, squirrel-cage, shorted, or compensation windings.

The machine 10 has a case 12 with openings 14, 16 in the respective sides 18, 20 thereof through which magnetic members 22, 24 project. The magnetic members are fixed in position in these openings by conventional means. While the magnetic members are shown as permanent magnets, they may, of course, be arranged differently or be electromagnets of a conventional type.

The armature 26 has a disc shaped body 28 mounted on a central shaft 30, with commutator elements 32 spaced around the shaft 30. The disc shaped body 28 has first and second flat sides 34, 36 to which U-shaped wire channels 38 are securely fixed to extend radially between the commutator elements 32 and the outer rim 40 of the armature body 28. The shaft 30 is received in bearings 42 seated in the case 12, thereby providing for rotation of the armature 26 relative to the magnetic members 22, 24.

Figure 2:
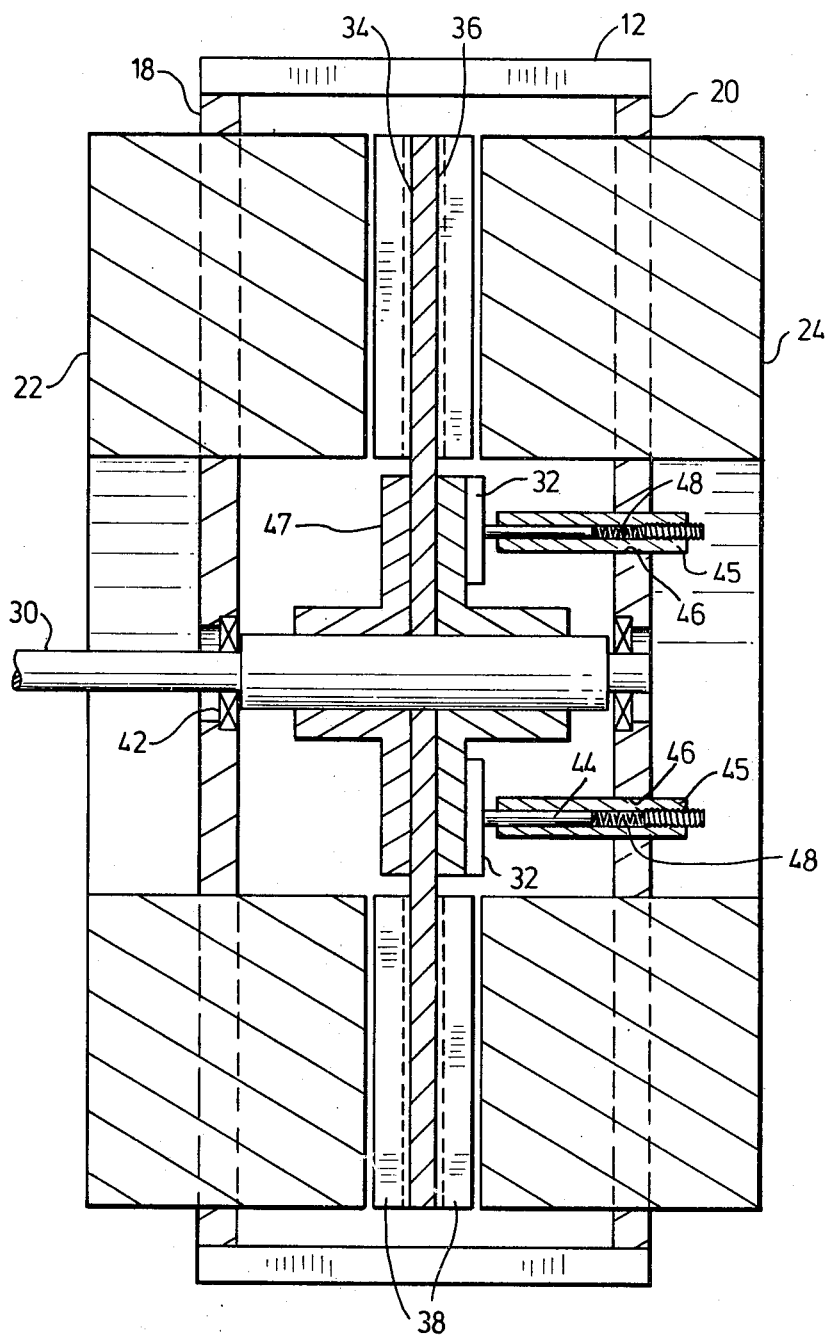
FIG. 2 is a sectional view of the motor seen in FIG. 1.

As may be seen in FIG. 2, when the machine is assembled, a minimum of clearance is provided between the wire channels 38 and the magnetic member 22, 24. Brushes 44 located in insulated holders 45 extend through holes 46 in the side 20 of the case and springs 48 exert a force on them to maintain the brushes 44 in frictional contact with the commutator elements 32. The commutator elements 32 are secured to a bracket 47 which in turn is fastened to the disc shaped body 28. If the bracket 47 is formed of a conductive material, it will be apparent that it is necessary to insulate the commutator elements 32 from it.

Figure 4:
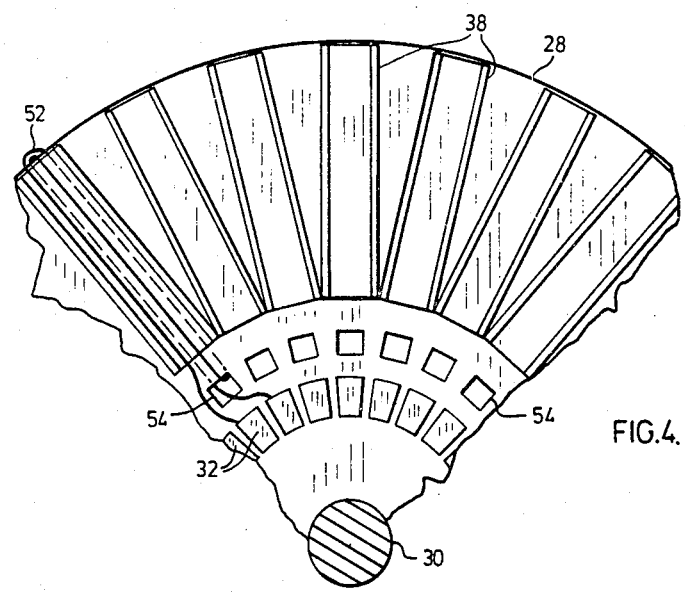
FIG. 4 is a partial view of an armature having windings according to another embodiment of the invention.
Figure 3:
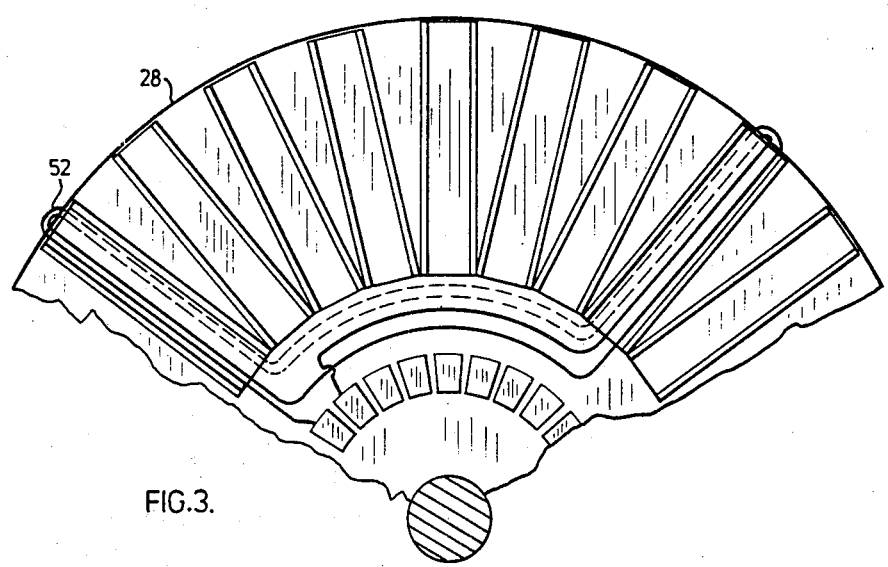
FIG. 3 is a partial view of an armature having windings according to one embodiment of the invention.

The armature 26 has a number of insulated wire windings which extend through the wire channels 38, although for simplicity they are not shown in FIGS. 1 and 2. FIGS. 3 and 4 show, somewhat schematically, two different types of windings according to the invention. In the first of these, known as a "single cross-over winding" shown in FIG. 3, the insulated wire 52 extends from one of the commutator elements 32 radially outward through the wire channel 38 on one side of the disc shaped body 28, crosses over the rim 40, returns through a wire channel on the other side of the body, extends along to another wire channel on the same side of the body through which it extends outwardly, passes back over the rim, and back down the first side of the body. This is repeated until a winding of a desired size is formed and then the wire is terminated at another one of the commutator elements 32. While this single cross-over winding arrangement does minimize the wire wastage where it crosses over the rim 40 of the disc shaped body 28, the wire extending along between the inner ends of the wire channels 38 and the commutator elements 32 in not located in the magnetic field during use which is undesirable.

A preferred type of winding known as a "double cross-over winding" is shown in FIg. 4. In this instance, the insulated wire 52 extends from one of the commutator elements 32 radially outward through a wire channel 38 on one side of the disc shaped body 28, passes over the rim 40, and returns through a wire channel on the other side. As may be seen, a number of apertures 54 are provided through the body 28, one being located in alignment with each pair of wire channels 38. The insulated wire 52 passes through the respective one of these apertures 54 and extends back out along the first side of the body 28. This is repeated until a winding is formed filling the wire channel 38, and the wire then terminates at one of the commutator elements 32. As may clearly be seen, this arrangement has the advantage that a very minimum of wire is used which is not located in the magnetic field during use. Similar windings would, of course, be located in each of the adjacent pairs of wire channels spaced around the disc shaped body 28. Another advantage of this structure and winding is that a burnt out or otherwise damaged winding may be replaced by itself without effecting the remainer of the windings. The size of the motor may, of course, be increased by increasing the diameter of the disc shaped body 28, but this does not result in more wasted or unused wire as in the prior art.

Figure 5:
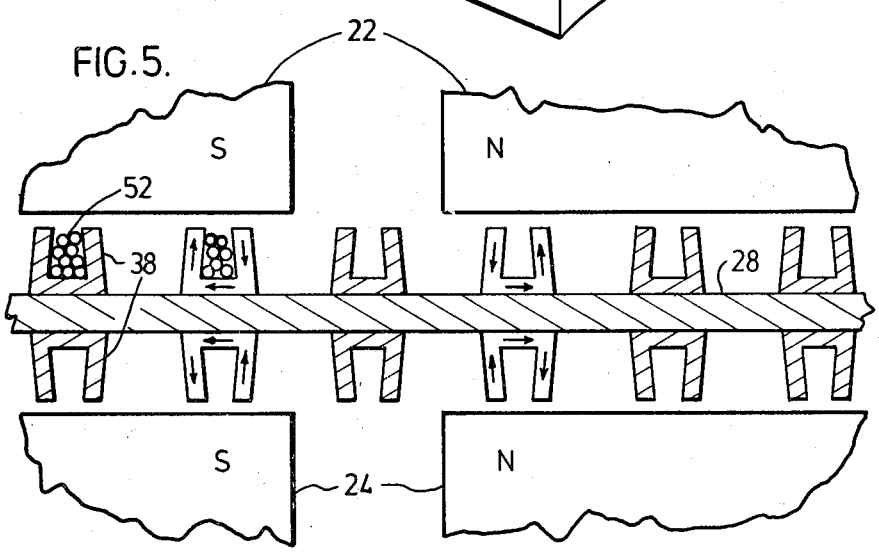
FIG. 5 is a partial sectional view of an armature structure according to the invention.

Reference is now made to FIG. 5 which shows in section a portion of the disc shaped body 28 with the wire channels 38 attached moving between the magnetic field members 22, 24. The disc shaped body 28 is formed of a material of relatively high reluctance such as high strength plastic or aluminum, while the wire channels 38 are formed of a material of low reluctance such as steel. As will be appreciated, the current in the wires in each pair of wire channels 38 is flowing in opposite directions and therefore the magnetic flux will travel around the U-shaped channels in opposite directions, as indicated by the arrows. While the wire channels 38 are shown as being generally U-shaped in cross section, they may be somewhat narrower at the top to reduce the air gap through which the magnetic flux has to travel. The wire channels 38 may be securely fastened to the disc shaped body 28 by screws or by adhesive means. This structure of U-shaped wire channels 38 has the advantage that they are separate from each other which avoids magnetic flux cancellation. Furthermore, they may be increased in cross sectional size to avoid magnetic flux saturation, but should not be so large as to result in avoidable reactance losses.

Figure 6:
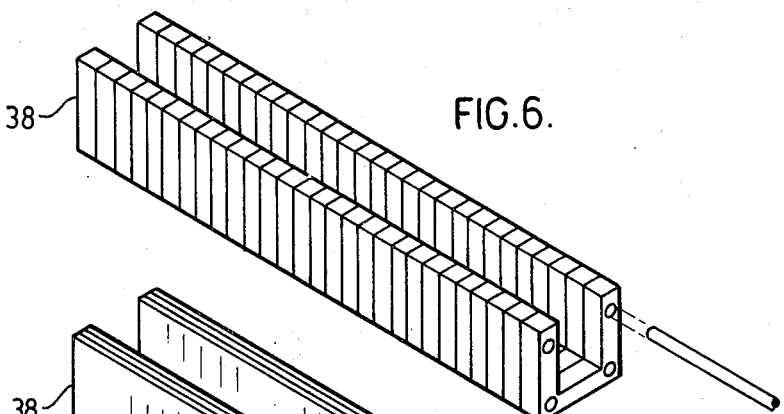
FIGS. 6 to 8 are perspective views showing various structures of armature channel members.
Figure 7:
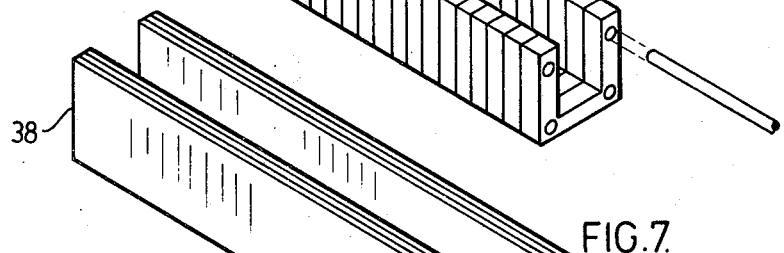
Figure 8:

Alternative forms of the wire channels 38 are shown in FIGS. 6 to 8. As may be seen, FIG. 6 shows a longitudinally laminated structure, while FIG. 7 shows a transversely laminated structure. Both of these are preferable formed of steel and the effect of the laminated structures is to reduce interferring eddy currents. FIG. 8 shows a wire channel structure with the width and depth thereof varying to accommodate the same cross sectional area of wire at the inner and outer ends. It will be appreciated that the shape and/or orientation of the magnetic members 22, 24 could be adapted to utilize this wire channel structure, while maintaining a minimum air gap between the rotating armature and the magnetic members.

Although the description of this invention has been given with respect to particular embodiments, it is not to be construed in a limiting sense. Many variations and modifications will now occur to those skilled in the art.

For a definition of the invention, reference is made to the appended claims.

What I claim is:

1. An improved disc type armature for a dynamoelectric machine comprising:
   (a) a body mounted on a central shaft and commutator means adjacent the shaft, the body being disc shaped with first and second sides and an outer rim; and
   (b) a plurality of windings on the disc shaped body, each winding formed of insulated wire extending from the commutator means radially outward along the first side of the body and back along the second side of the body;
   wherein the body is formed of a material of relatively high reluctance, and the windings extend through radially extending channels formed of relatively low reluctance material on both sides of the body.

2. An armature as claimed in claim 1 wherein the body has a plurality of apertures therethrough, each one of the apertures associated with one of the windings and located radially outwardly adjacent the commutator means, said one winding being formed of insulated wire wound radially outward from the commutator means along the first side of the body, radially back along the second side of the body to said one aperture, through said one aperture and back out along the first side of the disc, this being repeated for a number of turns with the wire eventually terminating at the commutator means.

3. An armature as claimed in claim 1 wherein each winding is formed of insulated wire wound along a path extending radially outward from the commutator means along the first side of the body, over the outer rim of the body, radially back along the second side of the body, circumferentially around a portion of the body outwardly adjacent the commutator means, radially outward along the second side of the body, back over the outer rim of the body, radially back along the first side of the body, and circumferentially back to the starting point, this being repeated for a number of turns with the wire eventually terminating at the commutator means.

4. An armature as claimed in claim 2 wherein the windings and the apertures are equally spaced around the disc shaped body.

5. An armature as claimed in claim 1 wherein the body is formed of a material of relatively high reluctance, and the windings extend through radially extending channels formed of relatively low reluctance material fixed to the body, the channels being generally U-shaped in cross section and uniformly spaced around both sides of the disc shaped body.

6. An armature as claimed in claim 1 wherein the body is formed of high strength plastic and the windings extend through radially extending laminated steel channels fixed to both sides of the disc shaped body.

* * * * *